ns patent Office 3,408,427
Patented Oct. 29, 1968

3,408,427
BIS(FLUOROPHENYL)PHOSPHORYL CHLORIDES
Robert H. Boschan, Los Angeles, and James P. Holder,
Woodland Hills, Calif., assignors, by mesne assignments,
to McDonnell Douglas Corporation, Santa Monica,
Calif., a corporation of Maryland
No Drawing. Filed Dec. 28, 1964, Ser. No. 421,641
4 Claims. (Cl. 260—960)

ABSTRACT OF THE DISCLOSURE

Fluorophenyl phosphoryl chlorides, including fluorophenyl phosphoryl dichlorides and bis(fluorophenyl)phosphoryl chlorides, having particular value as intermediates for producing fluorophenyl phosphates, especially useful as hydraulic fluids, lubricants and heat transfer media.

This invention relates to novel fluorinated phosphoryl chloride derivatives, and is especially concerned with the provision of novel fluorophenyl phosphoryl chloride compounds particularly useful as intermediates for the preparation of fluorophenyl phosphate esters.

In the copending application Serial No. 421,649, filed of even date herewith, entitled Fluoroaryl Phosphate Esters of Robert H. Boschan and James P. Holder, there is described and claimed novel fluorophenyl phosphates, including monofluorophenyl diphenyl phosphate and bis(monofluorophenyl)phenyl phosphate.

Said fluoroaryl, e.g., fluorophenyl, phosphates, as described in the above copending application, are valuable as functional fluids, e.g., as base stocks for hydraulic fluids, and are also useful as heat transfer media and as lubricants due to the advantageous physical properties of such compounds. These properties include high fire resistance, increased temperature stability, and liquidity over a relatively wide temperature range. Thus, for example, these fluorinated phosphate esters have a thermal stability in the range of about 600 to about 800° F., autoignition temperatures of the order of about 900 to about 1,000° F., and remain liquid down to a temperature of the order of about −60° F. Further, the viscosity of such phosphate esters at low temperatures of the order of −25 to −40° F. permits the operative use of such liquids as hydraulic fluids, cooling media and lubricants in these low temperature ranges. These compounds are also relatively nonvolatile at elevated temperatures due to the high boiling point of these materials. Also, certain of such phosphate esters, particularly the metafluorophenyl phosphate derivatives, have relatively low pour points, e.g., of the order of −50° to −60° F., or lower, which, together with the relatively low viscosity of these materials at low temperatures, permit the liquid compounds to be pumped without high expenditure of energy at low temperatures. Moreover, such phosphate esters have good hydrolytic stability, and do not adversely affect materials, e.g., steel, aluminum, and the like, with which they may be in contact.

The intermediates of the invention, which are particularly valuable for preparing the above-noted phosphate esters, are the monofluorophenyl phosphoryl chlorides, such compounds having the following formula:

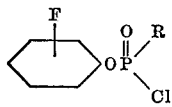

where R is a member selected from the group consisting of chlorine and

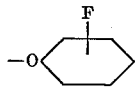

groups.

Thus, the fluorophenyl phosphoryl chloride intermediates of the invention include the monofluorophenyl phosphoryl dichlorides wherein R above is a fluorophenoxy group. Also, the fluorine substituent in the monofluorophenyl phosphoryl chloride derivatives defined by the formula above can be in the ortho, para or meta position of the phenyl nucleus with respect to the attachment of such nucleus to the oxygen atom. However, the meta fluoro derivatives are preferred, since these compounds are the intermediates employed in making the preferred meta fluorophenyl phosphate esters of the above copending application.

The fluorophenyl phosphoryl chloride compounds of the invention are prepared by reacting monofluorophenol with phosphorus oxychloride, POCl₃. When it is desired to obtain essentially monofluorophenyl phosphoryl dichloride, about 1 mole of the fluorophenol is employed per mole of phosphorus oxychloride, and when it is desired to obtain essentially bis(monofluorophenyl)phosphoryl chloride, about 2 moles of monofluorophenol are utilized per mole of phosphorus oxychloride. A mixture of these phosphoryl chloride compounds can be obtained by employing between 1 and 2 moles of monofluorophenol per mole of phosphorus oxychloride, and the two compounds, monofluorophenyl phosphoryl dichloride and bis(monofluorophenyl)phosphoryl chloride can be separated from the mixture by distillation at reduced pressure, such compounds having widely separated boiling points at reduced pressure. Usually an excess of POCl₃ is employed.

The reaction for producing such fluorophenyl phosphoryl chlorides is carried out by heating the reaction mixture of the monofluorophenol and phosphorus oxychloride for a period of time, usually several hours, until the reaction is substantially completed. The excess phosphorus oxychloride is removed by distillation, usually at atmospheric pressure, and the residue including the reaction product monofluorophenyl phosphoryl dichloride and/or bis(monofluorophenyl)phosphoryl chloride is distilled at reduced pressure to recover the desired monofluorophenyl phosphoryl chloride product or products.

The following are specific fluorophenyl phosphoryl chloride compounds produced according to the invention:

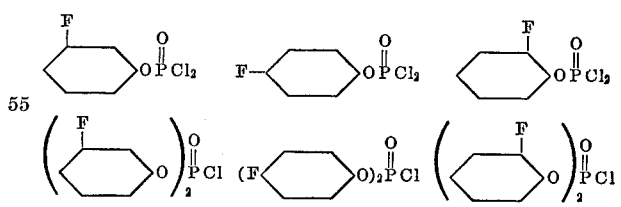

The following are examples of preparation of the fluorophenyl phosphoryl chloride compounds of the invention and also illustrating use of such compounds for producing fluorophenyl phosphate esters as described in the above copending application.

Example 1

To 230 g. (1.50 moles) of redistilled phosphorous oxychloride was added dropwise with stirring 112.1 g. (1.00 mole) of m-fluorophenol. The reaction mixture was maintained at reflux temperature during the addition, which was complete in one hour and 10 minutes. The mixture was held at reflux temperature for 37 hours. The mixture was then cooled and the phosphorus oxychloride was distilled off at atmospheric pressure.

The residue or remainder of the reaction mixture containing both m-fluorophenyl phosphoryl dichloride and bis(m-fluorophenyl)phosphoryl chloride, was distilled at reduced pressure to recover these compounds separately. The m-fluorophenyl phosphoryl dichloride distilled over at 60–61.5° C. (0.33–0.35 mm. mercury) recovering 145.4 g. of this compound. Analysis.—Calculated for $C_6H_4Cl_2FO_2P$: C, 31.47; H, 1.76; P, 13.53. Found: C, 32.29; H, 1.94; P, 13.05. The bis(m-fluorophenyl)phosphoryl chloride distilled over at 119.5–125° C. (0.38–0.39 mm. mercury), recovering 23.7 g. of this material. Analysis.—Calculated for $C_{12}H_8ClF_2O_3P$: C, 47.32; H, 2.65; F, 12.47; P, 10.17. Found: C, 46.77; H, 2.59; F, 13.26; P, 9.89.

Example 2

The procedure of Example 1 is substantially repeated, except employing about 1.50 moles of phosphorus oxychloride corresponding to about a one to one molar ratio of m-fluorophenol to $POCl_3$.

The major portion of the product which is produced is m-fluorophenyl phosphoryl dichloride.

Example 3

The procedure of Example 1 is substantially repeated, except employing about 0.75 mole of phosphorus oxychloride, corresponding to about 2 moles of m-fluorophenol per mole of $POCl_3$.

The major portion of the product which is produced is bis(m-fluorophenyl)phosphoryl chloride.

Example 4

The procedure of Example 1 is substantially repeated employing in place of m-fluorophenol, the same amount of p-fluorophenol.

The resulting product contains a mixture of p-fluorophenyl phosphoryl dichloride and bis(p-fluorophenyl)phosphoryl chloride. These products can be separated by fractional distillation at reduced pressure.

Example 5

The procedure of Example 1 is substantially repeated employing in place of m-fluorophenol, the same amount of o-fluorophenol.

The resulting product contains a mixture of o-fluorophenyl phosphoryl dichloride and bis(o-fluorophenyl) phosphoryl chloride. These products can be separated by fractional distillation at reduced pressure.

Example 6.—m-Fluorophenyl diphenyl phosphate

To a mixture of 62.1 g. (0.660 mole) of phenol, 52.2 g. (0.660 mole) of pyridine and 250 ml. of benzene was added dropwise with stirring 68.7 g. (0.300 mole) of m-fluorophenyl phosphoryl dichloride. The temperature was maintained at 10–17° C. during the addition, which was complete in one hour and 45 minutes. The mixture was heated slowly to reflux temperature and refluxed for 35 hours.

The mixture was then cooled and poured into 500 ml. of water. The upper organic layer was withdrawn and the aqueous was extracted with three 100 ml. portions of ether. The ether extracts were added to the organic layer, which was then washed with 100 ml. of 5% hydrochloric acid, 100 ml. of 5% sodium bicarbonate, and three 50 ml. portions of water. After drying over anhydrous magnesium sulfate, the solvents were removed by heating on a steam bath. The residue was then distilled at reduced pressure. The main product fraction, 92.5 g. (89.3% yield) distilled at 168–170° C. (0.19–0.23 mm. mercury).

The resulting product consisting essentially of m-fluorophenyl diphenyl phosphate, has a viscosity at 100° F. of 11.4 centistokes, a pour point of about 10° F., a thermal stability up to about 692° F., high autoignition temperature, good hydrolytic stability and high fire resistance. Such phosphate ester is useful as a fire resistant thermally stable hydraulic fluid or lubricant for general industrial purposes, e.g., in a hydraulic press or as a compressor lubricant.

Example 7.—Bis(m-fluorophenyl)phenyl phosphate

To a mixture of 117.7 g. (1.05 moles) of m-fluorophenol, 87.0 g. (1.10 moles) of pyridine and 400 ml. of benzene in a flask were added dropwise with stirring 105.0 g. (0.500 mole) of redistilled phenyl phosphoryl dichloride. The temperature was maintained at 15–20° C. during the addition, which was complete in 2 hours. The mixture was heated to reflux temperature and refluxed overnight. The mixture was then cooled and poured into 700 ml. of water. The bottom aqueous layer was withdrawn from the upper organic layer and was extracted with three 125 ml. portions of ether. The ether extracts were added to the organic layer, which was then washed with successive 100 ml. portions of 5% hydrochloric acid and 5% sodium bicarbonate, then washed with three 60 ml. portions of water. After drying over anhydrous magnesium sulfate, the solvents were removed by evaporation on a steam bath.

The residue was distilled at reduced pressure; the main phosphate ester fraction, 147.1 g. (81.2% yield) distilled at 150°–160° C. (0.12 mm. mercury).

The resulting phosphate ester product, bis(m-fluorophenyl)phenyl phosphate, has a density of 1.325 g./ml. at 77° F., a kinematic viscosity at 0° F. of 416 centistokes, and a pour point of —60° F. The compound remains liquid over a broad temperature range. In addition, such phosphate has a thermal stability up to 753° F., high autoignition temperature, good hydrolytic stability, and high fire resistance.

Such phosphate has particular utility as a hydraulic fluid or lubricant in an aircraft system.

From the foregoing, it is seen that the invention provides novel fluorophenyl phosphoryl chloride compounds having particular value as intermediates for producing fluorophenyl phosphates, which are especially suited for use as base stocks of hydraulic fluids in aircraft systems, and which are also useful as lubricants and as heat transfer or cooling media in aircraft systems.

While we have described particular embodiments of our invention for the purpose of illustration, it should be understood that various modifications and adaptations thereof may be made within the spirit of the invention, as set forth in the appended claims.

We claim:

1. A compound having the formula

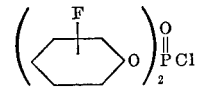

2. Bis(m-fluorophenyl)phosphoryl chloride.
3. Bis(p-fluorophenyl)phosphoryl chloride.
4. Bis(o-fluorophenyl)phosphoryl chloride.

References Cited

Zenftman, Chemical Abstracts, vol. 57, p. 6110 (1962).

CHARLES B. PARKER, *Primary Examiner.*

B. BILLIAN, A. H. SUTTO, *Assistant Examiners.*